United States Patent

Sutton

[15] 3,681,630

[45] Aug. 1, 1972

[54] AIR COOLED LINEAR MOTOR

[72] Inventor: David A. Sutton, Goleta, Calif.

[73] Assignee: Information Magnetics Corporation, Galeta, Calif.

[22] Filed: Aug. 16, 1971

[21] Appl. No.: 172,037

[52] U.S. Cl. .......................... 310/16, 310/13, 310/27
[51] Int. Cl. .............................................. H02k 41/02
[58] Field of Search ........................... 310/12–14, 16, 310/27; 179/115.5; 417/417

[56] References Cited

UNITED STATES PATENTS

| 2,931,925 | 4/1960 | Dölz .............................. 310/27 |
| 3,085,847 | 4/1963 | Massa ......................... 310/27 X |
| 3,417,269 | 12/1968 | Heller et al. ..................... 310/27 |
| 3,521,092 | 7/1970 | Kalthoff .......................... 310/13 |
| 3,597,122 | 8/1971 | Farmer .......................... 417/417 |

FOREIGN PATENTS OR APPLICATIONS

| 1,119,911 | 7/1968 | Great Britain ................. 310/27 |
| 885,025 | 12/1961 | Great Britain ................. 310/27 |

*Primary Examiner*—D. F. Duggan
*Attorney*—Harry W. Brelsford

[57] ABSTRACT

An open end motor of the linear motion type has a tubular air gap between a center core and a tubular magnet or field piece. An armature of tubular shape fits in the air gap and is mounted on a cup-shaped member. The relative movement between the core and the armature cup gives rise to a piston-cylinder structure which is utilized to pump air past the armature windings to cool them. A flexible washer on a closed end motor acts as a pump.

11 Claims, 5 Drawing Figures

INVENTOR
DAVID A. SUTTON
BY H.W. Brelsford
ATTORNEY

INVENTOR.
DAVID A. SUTTON
BY
H. W. Breleford
ATTORNEY

INVENTOR.
DONALD E. GILLUM
BY H.W. Brelsford
ATTORNEY

AIR COOLED LINEAR MOTOR

This invention relates to the cooling of linear motors and has special reference to the utilization of inherent structure of the motors to pump air past the armature to cool it.

Linear motors are utilized on the disk drives of computer memories to move read-write transducers or heads to any selected one of several hundred concentric tracks on a disk or stacked pack of disks. These disks can rotate at several thousand r.p.m. and the information on any one track is thus read off during a tiny fraction of a second and the head is then moved to a different track. A large accelerating current is then applied to the armature to accelerate it, a large decelerating current is then applied to stop it, and smaller stabilizing current are applied to maintain the read-write position on the track. The speed of movement can result in several hundred changes of position per second, utilizing several times this number of current flows per second. The armature thus becomes heated during rapid operation and this heat limits the power output of the motor.

A typical performance limiting constraint in high performance electric motors is material deterioration due to very high operating temperatures. This is found to be especially true in linear position motors such as the type used in the computer industry for positioning magnetic recording heads on rotating data storage disks. Very high velocity strokes of linear motion closely spaced in time are extremely valuable since typically a large and expensive computer system is waiting for the information available from the data storage disk after the completion of the linear motion stroke. High velocity, closely spaced strokes of linear motion relate directly to high power dissipation and heat rise in a linear motion electric motor.

It has been determined that the armature can be kept at a reasonably cool temperature by blowing sufficient air past it to carry away the heat. However, this requires extra mechanisms that are expensive and demand power, and contribute to the electric and electronic noise in the computer environment. These objectionable aspects of air cooling have prevented utilization of air cooling for linear motors and generally they have been operated at their lower output due to hot armatures, reducing the response time of the motor-operated devices.

* Frequently the performance of linear motors is enhanced by the use of compensation windings that counteract the flux build-up due to armature currents. These usually take the form of windings on the center core surface of the working air gap. The current flow in the compensation windings is approximately that in the armature and these compensation currents give rinse to additional heat. They heat not only the core, but radiate heat also to the armature.

I have discovered that inherent structure of a linear motor may be utilized as an efficient pump to force cooling air past the armature windings and compensation windings. This avoids the use of external pumps and the motors to operate them as well as conduits to the motors. The inherent linear motor structure is easily provided with valves and ports to create this pumping structure and action.

It is therefore a general object of the invention to convert parts of a linear motor into a pump structure to move cooling air past the armature.

Other objects, advantages and features of the invention will be apparent in the following description and claims, considered together with the accompanying drawings forming an integral part of this disclosure, in which:

Figure 1:
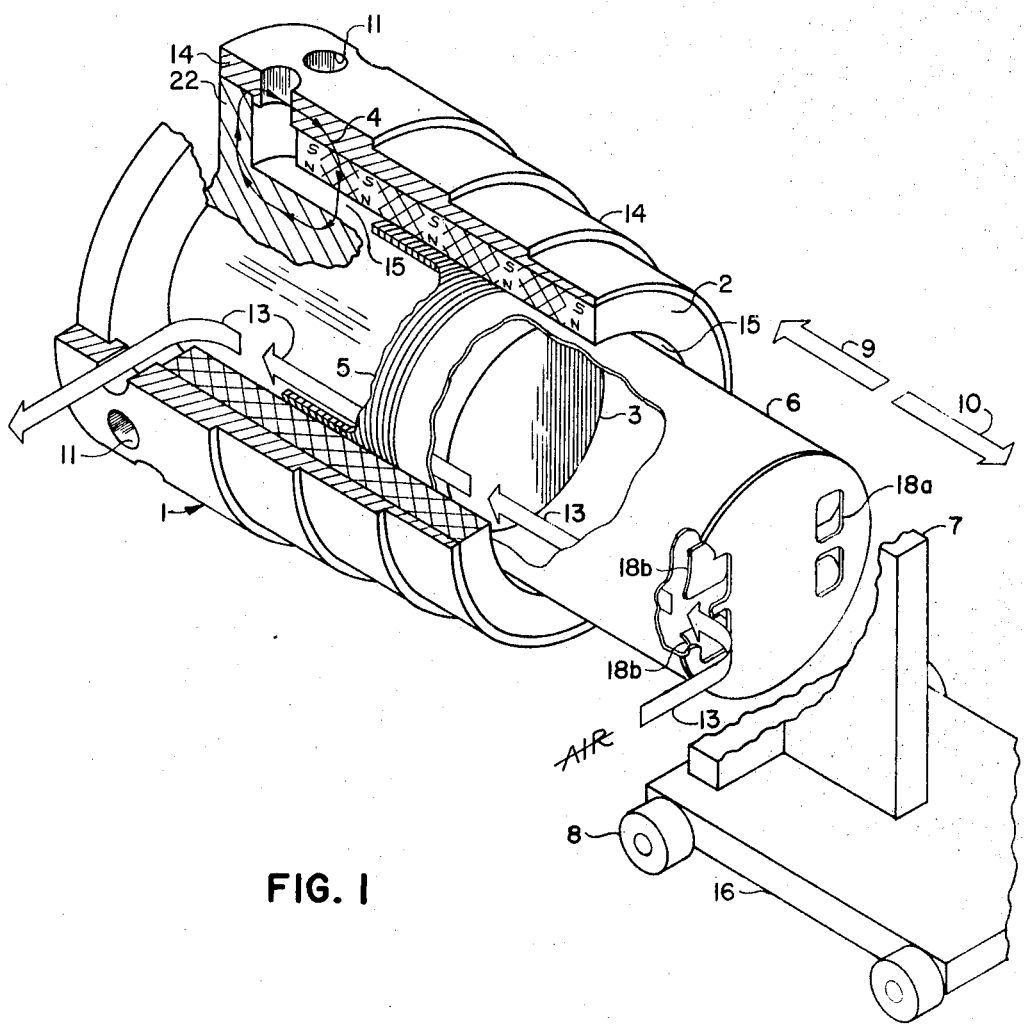
FIG. 1 is a three-dimensional view with portions broken away of an open ended linear motor embodying the invention, wherein the armature is supported by a cup-shaped member mounted on a carriage.

Referring to FIG. 1, there is illustrated a linear motor 1 having a tubular magnet 2 which may be radially polarized, and this creates a working air gap 15 between the inner surface of the tubular magnet 2 and a center core 3. The center core 3 is supported in cantilever fashion by means of an integral flange 22 on the left end thereof, as viewed in FIG. 1, which has a tight mechanical fit with an outer shell 14. The core 3 and its flange 22 and the outer shell 14 are made of a magnetic material, such as iron or low carbon steel, and there is illustrated by means of a closed loop 4 a representative flux path through a portion of the structure, it being realized that similar flux lines cut the entire length of the magnet 2. Located at the left in FIG. 1 in the outer shell 14 are a plurality of air ports 11 communicating the interior of the shell to atmosphere. Disposed in the air gap 15 is an armature winding 5, preferably a helical coil of wire, and this may have the same cross-sectional shape as the air gap, whether circular, rectangular, etc. The armature coil 5 is physically supported by a cup-shaped member 6 which is secured to one end of the armature coil 5 and the cup-shape 6, in turn, may be secured to a post 7 mounted on a carriage 16 which reciprocates back and forth on accurately machined wheels 8 riding on accurately machined rails (not shown). Formed in the right-hand end of the cup 6, as viewed in FIG. 1, or the "bottom" of the cup are a plurality of valve ports 18a having affixed on the interior thereof flap valves 18b which act as check valves. These may be formed of any suitable material such as is common with valves of this type, including extremely thin brass or stainless steel, sheet plastic, etc.

The operation of the device of FIG. 1 is as follows: Electrical current is supplied to the armature coil 5 in any suitable manner (not shown), and this causes the armature to move to the left or to the right, depending on the direction of current in the armature. The solidly attached cup 6 which supports the armature in its reciprocation within the working air space 15, of course, moves the armature 5 and this, in turn, moves the carriage 16 to which any suitable working tool may be attached, such as the read-write heads used as transducers on data disks in computers. The carriage 16, accordingly, may move to the left in FIG. 1 as indicated by the arrow 9, or it may move to the right, as indicated by the arrow 10. The armature coil 5 and the cup 6 form a cylinder which moves with respect to a stationary piston 3, the center core of the motor. These two elements, accordingly, form a piston-cylinder pump. When the cup moves to the right in FIG. 1, a partial vacuum is created inside of the cup, causing the flap valves 18b to open to admit air, as shown by the arrow 13. When the cup 6 moves to the left under the influence of the armature winding 5, this air is trapped because the flap valves 18b thereupon close against their ports 18a and the air inside of the cup is forced outwardly. The only effective opening for this escape of air is between the center core 3 and the armature winding 5, and the air, accordingly, moves in the direction of the arrows 13 to the exit ports 11 in the outer shell 14. In this fashion, the heat generated by the $I^2R$ losses will be carried away. In this fashion, dangerously high operating temperatures for the armature are eliminated, allowing the motor to work at peak power.

From the foregoing it can be seen that the usual tube that supports the armature 5 is utilized to form portions of a pump which drive air past the armature. No extraneous mechanism or extra motors are required, and instead an inherent structural part of the motor is utilized.

While the invention has been described with respect to a preferred type of motor, as required by the Rules, it will be appreciated that this same mechanism can be used on any open end linear motor, including those of the so-called "voice coil" type, wherein longitudinally polarized magnets terminate in a right-angle apertured plate and a center core is spaced in this aperture to form a working air gap. These different types of motors are referred to herein as having a field piece which is spaced from the center core to form the working air gap, and this language applies equally well to where the working air gap is formed against a magnet or formed against a bore in magnetic material.

Figure 2:
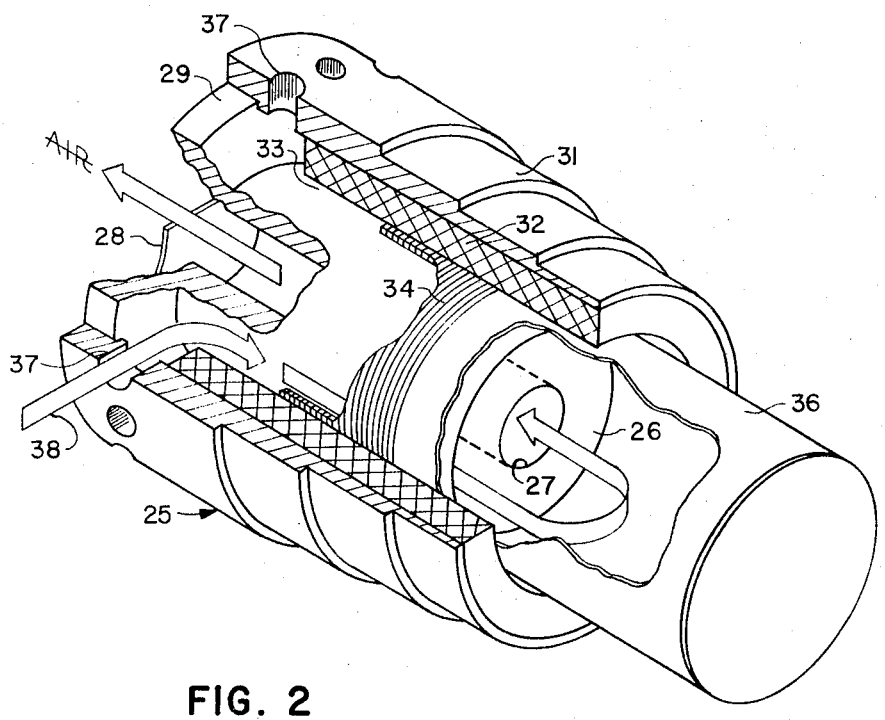
FIG. 2 is a three-dimensional view of a still different form of open ended linear motor with portions broken away, wherein the air flow is in a different direction from that of FIG. 1.

Referring to FIG. 2, there is illustrated a motor similar in frame structure to that described in FIG. 1, except that the air flow is reversed by virtue of a bore through the center core. The magnet windings are cooled on the suction stroke of the pump, rather than on the compression stroke of the pump. Accordingly, a motor 25 may have a center core 26 having a bore 27 therein which has a flap valve or a check valve 28 located on its left-hand end. A flange 29 on the left-hand end of the core 26, as shown in FIG. 2, tightly fits with an external shell 31 inside of which is fitted a magnet 32 which may be radially polarized similar to that of FIG. 1. A working air gap 33 may be formed between the interior surface of the magnet and the exterior surface of the center core 26 and disposed in this tubular working air space is an armature coil 34. This armature coil 34 may be suspended and supported by a cup-shaped member 36 similar to that of FIG. 1 and, accordingly, a showing of a carriage, guided way or similar structure is not illustrated. The operation of the device of FIG. 2 is the reverse of that of FIG. 1 insofar as air flow is concerned. When the currents in the armature 34 cause the armature coil 34 to move to the left it takes with it the supporting cup 36 and this cup and armature form a cylinder which works with the stationary core 26 which acts as a stationary piston in a piston-cylinder pump. The air compressed between the cylinder and piston, accordingly, exits through the center bore 27 which causes the check valve or flap valve 28 to open to permit this air to exit. Then the currents in the armature 34 cause it to move to the right the pump working chamber expands and the valve 28 closes and air is sucked through any suitable opening, such as through apertures 37 in the outer shell 31. Alternatively, the openings for inlet air could be formed in the flange 29 for the center core 26.

The operation of the device of FIG. 2 is as follows: When the cup 36 moves to the right, the valve 28 closes and air is sucked through the openings 37, as indicated by an arrow 38, and this air then flows between the center core 26 and the interior of the armature winding 34. The air then accumulates inside of the pump working chamber, that is, the area between the end of the center bore 26 and the right-hand end or "bottom" of the cup 36. When the currents in the armature 34 then changed in accordance with its demand, then the cup 36 moved to the right, compressing this air and forcing it out through the flap valve 28 to atmosphere. In this fashion, cooling air passes along the armature windings on the suction stroke of the piston-cylinder pump.

Figure 3:
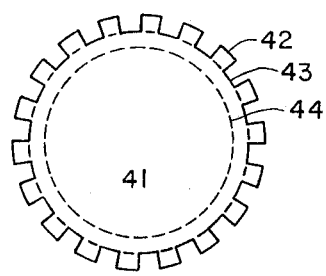
FIG. 3 is an end view of a center core of modified construction, which has lengthwise serrations to permit passage of more cooling air than is the case with a smooth center core.

Referring to FIG. 3, there is illustrated a modified form of the invention, wherein grooves or passes are provided in the core so that additional volumes of air can be accommodated. The dimension between the interior of the armature and the exterior of the center core are frequently very minute and, for example, in motors of about 4 inches in diameter, this dimension may be about one-hundredth of an inch. A similar clearance, of course, prevails between the exterior of the armature coil and the field piece forming the other surface of the working air gap. Very frequently, therefore, the performance of the motor is delayed because of the cushioning effect of the air compressed by the cup when the cup moves to the left, and the suction delay effect when the cup moves to the right. Because of the fact that the material of the center core is usually of a highly magnetic permeability, such as soft iron, the core can conduct several times the flux density of the flux field present, whether this be by way of radially polarized magnets, as shown in FIG. 2, or by way of a field piece of the end cap type used on voice coil motors. This means, therefore, that material from the surface of the center core may be removed without weakening the over-all flux present in the working air gap of the motor. Illustrated in FIG. 3 is an end view of such a modified form of center core 41, wherein there are lengthwise splines 42 which define between them channels 43 for the passage of additional air. These splines may be of the entire length of the center core 26. Frequently, linear motors employ compensation coils and illustrated in broken outline in FIG. 3 is a compensation coil 44 which may be placed in grooves on the cylindrical surface of the center core 41, but these are deep enough so that compensation wire may be placed in these grooves without obstructing the lengthwise passages 43. These is sufficient turbulence present in the air passing along the lengthwise passages 43 so that the air effectively contacts the inner surface of the armature to carry away the heat present on the armature.

Figure 4:
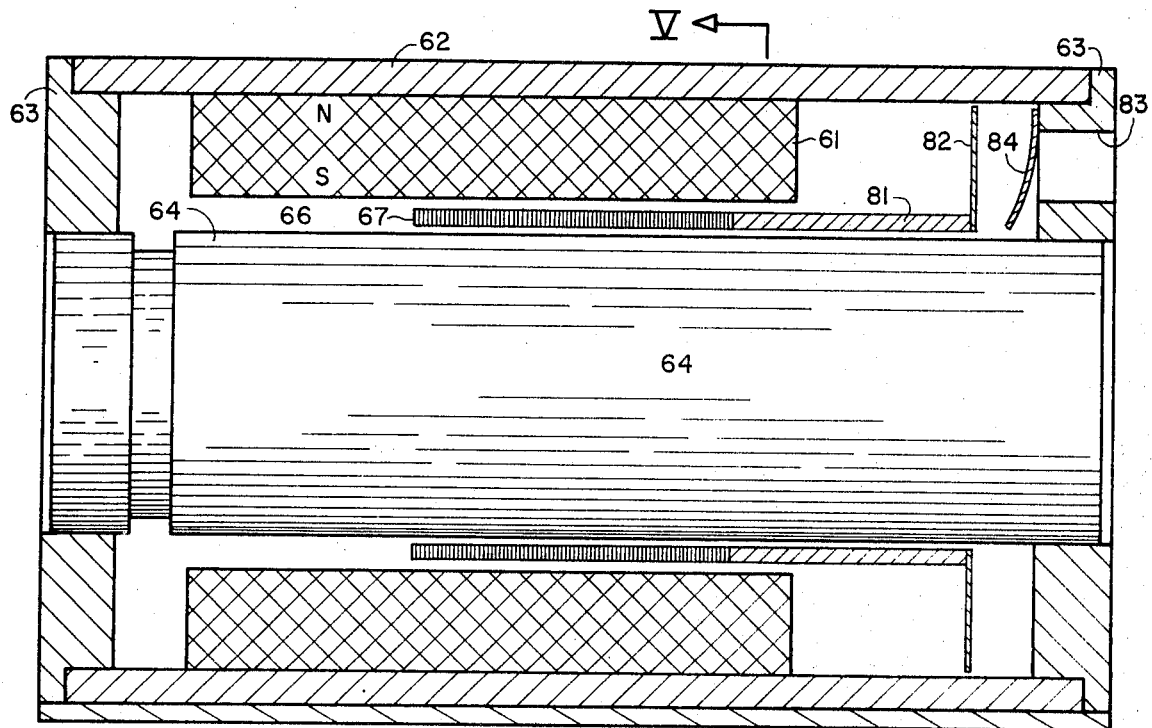
FIG. 4 is an elevation view in full section of a linear motor having closed ends, wherein the air valves are disposed in the end plate of the motor.
Figure 5:
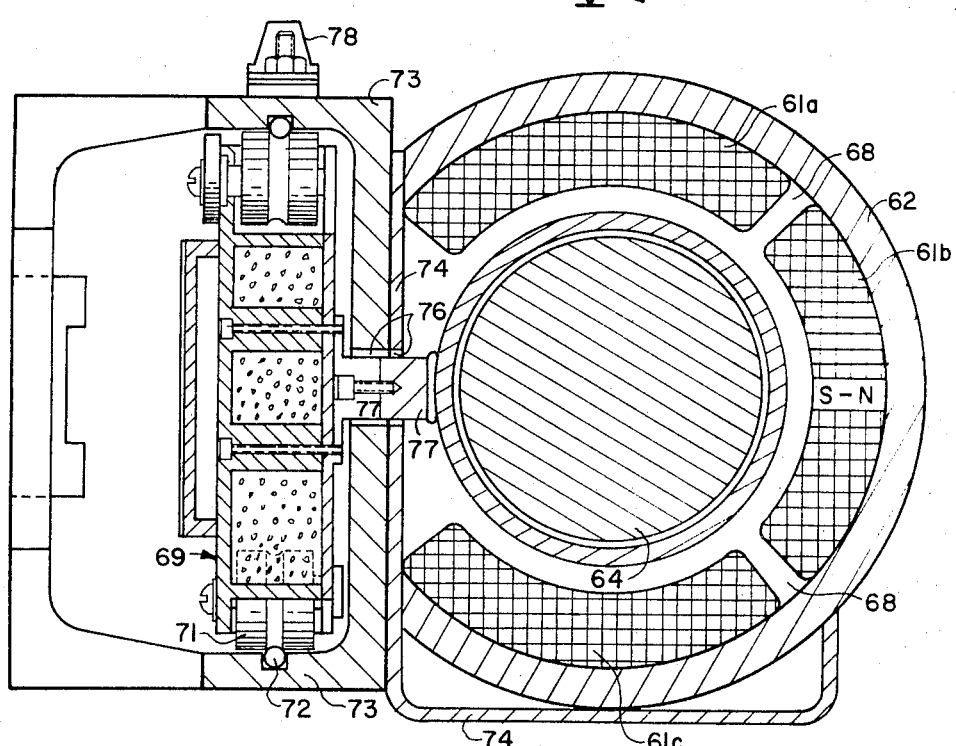
FIG. 5 is a sectional view of the motor of FIG. 4 taken along the line V—V of FIG. 4, wherein the armature is supported on an integrally mounted carriage.

Referring to FIGS. 4 and 5, there is illustrated the application of the invention to a linear motor of the closed end type. Accordingly, an outer shell 62 may have segments of magnet 61 adhered thereto and this is conveniently done by several lengthwise sections 61a, 61b and 61c. In this particular configuration of motor, one quadrant of magnet is missing in order to accommodate a carriage 59 which is mounted on rollers 71 which ride on rails 72 in a channel-shaped member 73 held against one side of the motor shell 62. To provide a base for the motor and carriage combination, a J-shaped member 74 may be welded or otherwise secured to the external shell 62. Disposed at each end of the shell 62 are end caps 63 which support a center core 64. A working air gap 66 is formed between the exterior of the center core 64 and the interior of magnet 61. Disposed in this working air gap 66 is an armature winding 67 which is supported, as shown in FIG. 5, by the carriage 69 by means of a two-piece support 77 which is epoxied or otherwise secured to the armature 67.

Projecting from the right end of the armature 67 as viewed in FIG. 4, is a non-metallic cylindrical extension 81 to which is secured a washer 82 which sweeps the chamber between the right-hand end of the magnet 61 and the right-hand end cap 63. Provided particularly in accordance with the invention are one or more ports 83 having a flap valve or check valve 84 secured to the inner side thereof.

The operation of the device of FIGS. 4 and 5 is as follows: When electrical current is supplied to the armature 67 by any suitable means, such as conductors connected from a stationary terminal to the moving carriage 69, it may move to the left for the proper direction of current flow, and this carries with it the shell extension 81 causing the washer 82 to sweep the chamber in which it is located. This causes air to be sucked through the port 83 and the flap valve 84 opens, as shown, to accommodate this flow of air. When next the current passing through the armature 67 causes it to move to the right, the air between the washer 82 and the right end wall 63 is trapped, the valve 84 closes, and the only escape for the air is to the left along the tubular space between the armature 67 and the core 64. This flow of air cools the armature and the heated air may exhaust through a slot 76 in the J-shaped member 74 through which the armature supports 67 extend. Alternatively, ports could be cut in the left-hand end wall 63 to accommodate this flow of exhaust air. From this description of the operation, it will be apparent that the structure illustrated in FIG. 4 forms a uni-directional pump flow which cools the armature 67.

From the foregoing description of embodiments illustrating the invention, it will be apparent that the pump can function on either the suction stroke or the compression stroke to furnish cooling air past the armature. It is apparent also that the valve can be located in either the moving part connected to the armature, or in the center core, or in the end walls. Various structures taking advantage of the inherent motor design can be utilized to cause a chamber to expand or contract to give rise to air flow and suitable valving can be incorporated. Accordingly, the present invention is not limited to the specific embodiments shown as they are merely illustrative of the invention. Included within the scope of the following claims are all modifications and variations of the invention that come within the true spirit and scope of the invention.

I claim:

1. An air cooled linear motor of the open end type comprising
   a. a magnetized field piece having a bore;
   b. a center core spaced from the bore to define a tubular working air gap and having an outer end;
   c. a tubular armature reciprocable within the air gap in response to current flow therein and having an inner end and an outer end;
   d. a cup-shaped member secured to the outer end of the armature and cooperating with the outer end of the core to define a cylinder-piston pump;
   e. and a check valve in at least one of said core and cup to admit atmospheric air on one stroke and exhale air in the other stroke to move air past the armature coils to cool the same.

2. An air cooled linear motor as set forth in claim 1, wherein a check valve is in the cup.

3. An air cooled linear motor as set forth in claim 1, wherein a check valve is in the core.

4. An air cooled linear motor as set forth in claim 1, wherein the core is splined to reduce the resistance to air flow without reducing the magnetic strength of the working air gap.

5. An air cooled motor as set forth in claim 1, wherein the cup supports the armature for reciprocation.

6. An air cooled linear motor comprising:
   a. a tubular shell;
   b. a center core spaced from the shell to define a working air gap;
   c. a tubular armature coil disposed in the air gap for reciprocation therein;
   d. pump means secured to the armature and cooperating with at least one of said core or shell to form a pump;
   e. a check valve communicating one side of the pump means to atmosphere and located in at least one of said pump means, shell or core to move atmospheric air along said armature to cool the same.

7. An air cooled linear motor as set forth in claim 6, wherein one end of the motor is open and the pump means is a cup secured to the outer end of the armature to form a piston-cylinder pump with the core.

8. An air cooled linear motor as set forth in claim 6, wherein both ends of the motor are closed and the pump means is a washer secured to the armature.

9. An air cooled linear motor as set forth in claim 6, wherein the check valve is located in the pump means.

10. An air cooled linear motor as set forth in claim 6, wherein the check valve is on the core.

11. An air cooled linear motor as set forth in claim 6, wherein the check valve is on the shell.

* * * * *